United States Patent Office

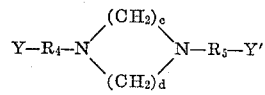

3,547,875
Patented Dec. 15, 1970

3,547,875
POLYOLEFINS STABILIZED WITH TERTIARY AMINE GROUPS-CONTAINING COMPOUNDS
Joseph E. Bonkowski, Raleigh, N.C., assignor to Hercules Incorporated, Wilmington, Del., a corporation of Delaware
No Drawing. Continuation-in-part of application Ser. No. 728,790, May 13, 1968. This application Apr. 11, 1969, Ser. No. 815,481
Int. Cl. C08f 45/60
U.S. Cl. 260—45.8         9 Claims

ABSTRACT OF THE DISCLOSURE

Olefin polymers are stabilized by incorporating therein certain compounds containing tertiary amine groups in amounts sufficient to yield 0.02 to 2% tertiary nitrogen based on the total weight of the stabilized composition.

---

This application is a continuation-in-part of my copending U.S. application Ser. No. 728,790, filed May 13, 1968, and now abandoned.

This invention relates to the improvement of the light stability of olefin polymers. In particular, it relates to compositions comprised of polymers of ethylene or α-olefins of 3 to about 6 carbon atoms and containing certain specific teritary amines as light stabilizers.

It is well known that, while polymers of ethylene and α-olefins, for example polyethylene, polypropylene, and poly(4-methyl pentene-1) are in many respects highly desirable materials for formation into extruded and molded products, they suffer severe degradation under the influence of light and heat unless they are treated or modified to increase their stability. Much effort has been expended toward improving this property of these polymers and considerable success has been achieved. The patent literature and technical journals are replete with teachings of techniques for improving one or the other of these properties. The most common and perhaps most effective method of improving stability has been to incorporate a phenolic antioxidant, a thiodialkanoic acid ester, an organic phosphite, or a combination of these materials into the polymer.

It has now been found, in accordance with the present invention, that certain non-aromatic tertiary amine-containing compounds are highly effective light stabilization additives when incorporated into the aforesaid olefin polymers. Specifically, the instant invention is a stabilized polymer or copolymer of ethylene or an α-olefin of 3 to 6 carbon atoms containing a tertiary amine having a structural formula selected from the class consisting of (A)
$$R_1(CH_2)_x-\underset{R}{N}-(CH_2)_yR_2$$

where $(CH_2)_x$ and $(CH_2)_y$ are the same or different normal or branched alkylene radicals of 1 to about 36 carbons, R is an aliphatic, cycloaliphatic, or heterocyclic radical or is the same as $(CH_2)_xR_1$ or $(CH_2)_yR_2$, said $R_1$ and $R_2$ being a hydrogen, methyl, primary amino, secondary amino or tertiary amino, carboxyl, carboxyalkyl, halogen, ether or thioether group or a condensation product of such compounds in cases where $R_1$ and $R_2$ are capable of further reaction:

(B)
$$X''-R_4 \diagdown \diagup (CH_2)_a$$
$$\phantom{X''-R_4}C$$
$$\phantom{X''-R_4}\diagup \diagdown N-R_5-X$$
$$X'-R_3 \phantom{\diagup} (CH_2)_b$$

where $a$ and $b$ are integers from 0 to 4, whose sum is either 3 or 4, $R_3$, $R_4$ and $R_5$ are the same or different aliphatic, cycloaliphatic or heterocyclic radicals and X, X' and X'' are the same or different primary amino, secondary amino, hydroxyl, carboxyl, carboxyalkyl, ether or thioether groups or hydrogen; and (C)
$$Y-R_4-N \diagup \overset{(CH_2)_c}{\diagdown} N-R_5-Y'$$
$$\phantom{Y-R_4-N}\diagdown (CH_2)_d \diagup$$

where Y and Y' are the same or different primary amino, hydroxyl, carboxyl, carboxyalkyl, ether or thioether groups, and one of Y or Y' can be hydrogen; $R_4$ and $R_5$ are as defined in (B) above and $c$ and $d$ are integers from 0 to 4, whose sum is 4.

The molecular weight of the additive is not especially critical so long as the additive is capable of being incorporated into the polymer and retained during forming and other processing steps. Thus the additive should not be excessively volatile such that it evaporates during spinning of filaments, extrusion of film or the like. Precise limits of molecular weight cannot be specified since such volatility is more a function of the functional groups in the compound than it is of molecular weight. In general, however, most compounds fitting the above description will have a molecular weight of at least about 135, and more frequently at least 150.

Exemplary compounds of the first class include trialkyl amines such as trilauryl and trieicosyl amine, tricyclohexyl amine, N,N-bis(3-aminopropyl) methyl amine, and acylated derivatives thereof such as N,N-bis(3-alkylamidopropyl) methyl amines, for example, N,N-bis(3-stearamidopropyl) methyl amine, n-hexyl amine-N,N-diacetic acid or ester, N-octyl diethanol amine, N-alkyl alkylene polyamines such as tetramethyl hexamethylene diamine, N-alkylated polyethylene imines, and tetrahexyl ethylene diamine, alkylated rosin amine, and n-pentyl di-(2-ethoxyethylene) amine, and ethylene diamine tetraacetic acid, inter alia.

Exemplary compounds of the second class are piperidine derivatives such as, e.g., N-hexyl piperidine, N-octyl piperidine, n-cyclohexyl piperidine, piperidine-N-acetic acid, N-hexyl piperidine-4-acetic acid, 4-n-hexyl-N-n-hexyl piperidine, 4-ethyl-N-cyclohexyl piperidine-4-acetic acid, N-cyclohexyl piperidine-4,4-diethanol, piperidine-N-acetic acid hexyl ester, formaldehyde-piperidine condensation products, N-(4-aminobutyl) piperidine, N,N'-bis[2-carbomethoxy]-1,3-di-4-piperidyl propane, and bis-piperidyl alkanes such as 1,3-bis(n-alkyl-4-piperidyl) propane inter alia. Similar derivatives of pyrrolidine are also included in this class.

Exemplary compounds of the third class are derivatives of piperazine, e.g., N,N'-bis(3-aminoalkyl)piperazine, such as N,N-bis(3-aminopropyl)piperazine, acylated aminoalkyl piperazines such as N,N'-bis(stearamidopropyl) piperazine, N-lauryl piperazine, N-cyclohexyl piperazine, N,N'-bis-cyclohexyl piperazine, N-(5-hydroxypentyl) piperazine, N-(6-mercaptohexyl) piperazine, N,N'-bis(3-propoxypropyl) piperazine, and N,N'-bislauryl) piperazine, inter alia.

The novel light stabilizers of the instant invention can be used alone or in combination with other light stabilizers. In all cases, they are highly effective when used alone. In most cases, however, they will be used in combination with a heat stabilizer such as phenolic antioxidant.

The increased light stability of the compositions containing tertiary amines according to this invention is a function of the tertiary amines according to this invention is a function of the tertiary amine content of the specific compound selected. For this reason, the concentration of the additive, per se, with respect to polypropylene can vary over a wide range. However, the tertiary amine nitrogen content (i.e., trisubstituted N) must be between about 0.05 and 2% for maximum utility and will preferably be between about 0.1 and 1%. Higher concentrations will, of course, continue to yield effectively stabilized compositions but the amount of additive required to supply this amount of tertiary amine nitrogen will usually be so great as to create problems in later processing of the polymer into which it is incorporated.

Any polymer of an α-olefin, including ethylene, can be stabilized by the tertiary amine-containing compounds of this invention. Typical polymers in this class are linear and branched (i.e., high and low density) polyethylene, polypropylene, poly-(butene-1), poly(4-methyl pentene-1) and poly(3-methyl butene-1). Copolymers of the above monomers can also be stabilized. This includes both the crystalline copolymers of, e.g., ethylene and porylene or ethylene and butene-1 where the major monomer comprises about 90% or more of the copolymer as well as the amorphous rubbery copolymers where the major monomer comprises, e.g., about 50 to 85% of the total monomer. These can also contain a small fraction of a third monomer, a diene such as, e.g., dicyclopentadiene, ethylidene norbornene, norbornadiene, and 1,6-hexadiene, to introduce sulfur vulcanizable points of unsaturation into the composition. The preferred polymers are polypropylene, high density polyethylene and the crystalline copolymers of ethylene and propylene with each other or with butene-1.

The stabilized polymers according to the invention can be used in preparation of extruded and cast film, injection molding applications, compression molding and in fiber preparation. In fact, they are usable in any application where the thus stabilized polyolefin might otherwise be used and where light stability would be a desideratum. Most frequently, this will be in film or fiber.

In the examples which follow the efficiency as light stabilizers of several compounds from each of the above specified classes is demonstrated. Stabilization effectiveness is compared to that of a control specimen containing a conventional olefin polymer stabilization system and is expressed as the percentage of the initial tensile strength of the test specimen after specified periods of exposure to sunlight. The exposure period is expressed in langleys, the langley unit being one gram calorie of radiant energy per square centimeter of polymer urface. The specimens are usually tested in South Miami, Fla., where exposure from sunrise to sunset for about one month is equivalent to approximately 10,000 langleys, in most months. Alternatively, the stability can be expressed as the exposure period in langleys required to effect 100% reduction in tensile strength.

Testing is accomplished, in the case of yarn, by weaving the same into a fabric with an acrylic warp, the weave being such that the olefin polymer is predominantly on the surface. This fabric is then supported in a rack, exposed to sunlight and sampled at 10,000 langley intervals, and tensile tested. Sections of film are exposed and tested in like manner.

EXAMPLE 1

A 500 ml. resin kettle equipped with a stirrer, thermometer, nitrogen sparge and distilling head for water of reaction removal is charged with 200 grams stearic acid (0.70 mole). The acid is brought to 125° C. at which time 50.8 grams N,N-bis(3-aminopropyl) methyl amine (0.35 mole) is added from a dropping funnel over a 5-minute period. After the addition of the amine the temperature of the system is brought to 1-75° C. for 6 hours. The product is poured into an aluminum pan and allowed to cool in a desiccator in a nitrogen atmosphere. The product is recrystallized in 50/50 (V./VO.) methanol-acetone and dried in vacuum (60° C.). Yield is about 210 grams of N,N-bis(3-stearamidopropyl)methyl amine, M.P. 96–98° C. Titration with 0.1 N alcoholic KOH reveals a carboxyl content of 29 eq./$10^6$ grams titratable amine =2.72×$10^{-3}$ eq./gm.

The recrystallized bis-stearamide is incorporated into a heat stabilized stereoregular polypropylene (0.25% of a phenolic antioxidant) by dry blending 7.5 parts thereof into 92.5 parts of polymer of about 2.5 intrinsic viscosity. The dry blend is melted in an extruder, then extruded and pelletized. Tertiary amine nitrogen content of the blend was 0.29%. The resulting pellets are then extruded at 230° C. and drawn about 300% into a 210-denier, 35-filament yarn which was gathered onto a bobbin. The tensile strength of these filaments is about 3.5 grams per denier.

Specimens of the drawn yarn are prepared for testing as described above and subjected to atmospheric aging in sunlight. After approximately 50,000 langleys exposure, their tensile strength is 1.4 grams per denier, a reduction of about 60%. By contrast, a control specimen similarly treated containing 0.5% 2-hydroxy-4-octyloxy benzophenone as a light stabilizer has no tensile strength after about 50,000 langleys.

EXAMPLE 2

One-half mole of di(hexamethylene) triamine (107.7 grams) is placed in a 500 milliliter resin kettle equipped with a stirrer, thermometer, nitrogen sparge and distilling head. The kettle is also charged with one mole (298.5 grams) of methyl laurate. The two reactants are heated ot 150° C. with stirring until all of the liberated methanol is removed. The product exhibits a titratable amine content of 1.73×$10^{-3}$ equivalents per gram when titrated with 0.5 N HCl. The total nitrogen content is 7.26%.

The product is dissolved in ethanol and the secondary amine nitrogen is alkylated by adding thereto one mole of methyl iodide per equivalent of titratable nitrogen. When all of the methyl iodide has been added, the reaction mass is refluxed for 2 hours, then cooled to room temperature and the appropriate amount of NaOH added to obtain a free tertiary amine. The product is filtered to insure removal of all sodium iodide and the bis-lauramide is recovered by evaporation of the ethanol. The bis-lauramide alkylated with methyl chloride in this way exhibits 1.68×$10^{-3}$ equivalents of titratable amine per gram when titrated with 0.5 N HCl.

Eight parts of this alkylated bis-lauramide of dihexamethylene triamine is compounded into 92 parts of high density polyethylene. Tertiary amine nitrogen content is 0.19%. The composition is extruded into a chill roll cast film 1 mil thick. The tensile strength of this film is 3550 p.s.i. After 20,000 langleys aging in sunlight as explained above, the tensile strength is 1800 p.s.i., or about 50% retention. By contrast, a similar film stabilized with a more conventional light stabilizer system, i.e., 0.5% of 2-hydroxy-4-octyloxy benzophenone, retains only 30% of its tensile strength after 20,000 langleys.

EXAMPLE 3

One-half mole (59.6 grams) of freshly distilled N-methyl diethanolamine is placed in the 500 milliliter resin kettle along with 100 milliliters of water. To this is added with cooling 40.0 grams sodium hydroxide. When all of the sodium hydroxide has been added, 1 mole (333.4 grams) of stearyl bromide is slowly added at 50° C. in a nitrogen atmosphere.

The resulting distearyl ether, N,N-bis(2-stearoxyethyl) methyl amine, separates in the water. The product is washed several times with water to remove residual sodium bromide and dried under vacuum at 50° C. Nitrogen content in the product is about 2.02%.

When the N,N-bis(2-stearoxyethyl) methyl amine is evaluated as a light stabilizer in polypropylene yarn at a level of .15% tertiary nitrogen (7.5% additive) based on the total weight of the composition, the yarn is found to retain 30% of its initial tensile strength after 50,000 langleys.

EXAMPLE 4

Stereoregular polypropylene yarn is prepared containing 5% by weight of n-lauryl piperidine (0.28% tertiary amine nitrogen). This yarn exhibits 50% retention of tensile strength after 50,000 langleys exposure.

EXAMPLE 5

One-half mole (105.2 grams) of 1,3-di-4-piperidyl propane is reacted with one mole (92.6 grams) of n-butyl chloride in 100 ml. of ethanol at 60° C. with stirring in a nitrogen atmosphere. The reactants are refluxed for 12 hours at which time 40 grams of sodium hydroxide is slowly added. When the addition of sodium hydroxide has been completed the product is cooled, filtered to remove sodium chloride, and isolated by evaporating ethanol. It is dried in a vacuum oven at 50° C.

The product is 1,3-bis(N-butyl-4-piperidyl) propane. This material is blended with polypropylene to a level of 5% based on total weight of the composition (0.4% tertiary nitrogen) and spun into yarn. This yarn retains 50% of its tensile strength after 50,000 langleys.

EXAMPLE 6

A 1 mil oriented film is prepared by extruding a composition comprising 95 parts stereoregular polypropylene and 5 parts of a polyamine resin prepared by condensing formaldehyde with 1,3-bis-4-piperidyl propane having the approximate structure

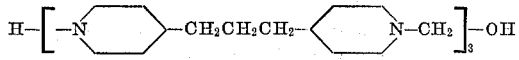

The composition is extruded at 230° C. and biaxially drawn 6X for orientation. The film has a tensile strength of about 31,500 p.s.i. before aging. After 10,000 langleys, its tensile strength is 12,500 p.s.i., i.e., about 40% of the original.

A control specimen containing 0.5% of 2-hydroxy-4-octyloxy benzophenone as a light stabilizer, retains only 10% of its original tensile strength after 10,000 langleys exposure.

EXAMPLE 7

One-half mole (105.2 grams) of 1,3-di-4-piperidyl propane in 150 milliliters methanol at 10° C., is reacted with 1.0 mole dimethylaminoethyl methacrylate (157.2 grams) substantially as shown in U.S. Pat. 3,331,888. The mixture is kept at 0 to 10° C. for 6 hours after which time the temperature is raised to 25° C. for 24 hours. The solvent is then removed by distillation. The product is then cooled and washed several times with methanol. It is dried in a vacuum oven at 50° C. This reaction product is bis(2-dimethylaminoethyl) propane 1,3-bis(4-piperidyl isobutyrate).

A polypropylene yarn containing 5% of this additive (0.5% tertiary nitrogen) exhibits about 60% tensile strength retention after 50,000 langleys.

EXAMPLE 8

One-half mole (100.1 grams) of N,N'-bis(3-aminopropyl) piperazine is reacted with 1.0 mole of methyl stearate at 100° C. in a nitrogen atmosphere. When all the methanol of the reaction has been distilled off the product, N,N'-bis(3-stearamidopropyl) piperazine, is poured into an aluminum pan or other appropriate container and cooled, then recrystallized from methanol. The total titratable amine is $2.73 \times 10^{-3}$ equivalents per gram when titrated with 0.5 N HCl.

A yarn of a random copolymer containing 97% propylene and 3% ethylene containing 7.5% of this additive (0.29% tertiary nitrogen) retains 50% of its tensile strength after 50,000 langleys.

EXAMPLE 9

One-half mole (100.1 grams) of N,N'-bis(3-aminopropyl) piperazine is reacted with 0.5 moles (82.5 grams) of n-hexyl bromide for 2 hours in ethanol, after which 0.5 mole of sodium hydroxide is added. Another 82.5 grams of n-hexyl bromide is then added, followed by another 0.5 mole sodium hydroxide. This step is repeated twice more and the product, N,N'-bis(3-dihexylaminopropyl) piperazine is recovered by filtration and evaporation of solvent. Titratable amine content is 10.5%.

The product is compound into polypropylene to prepare a composition having 95% polypropylene and 5% N,N'-bis(3-dihexylaminopropyl) piperazine (0.52% tertiary nitrogen). This is extruded into 210/35 yarn which retains 50% of its tensile strength after 50,000 langleys exposure.

EXAMPLE 10

One mole (170 grams) of N-(2-chloroethyl)pyrrolidone hydrochloride and 300 ml. of ethanol is placed in a 2-liter flask. One mole (349.6 grams) of dilauryl amine in in 400 ml. of ethanol is added at room temperature with stirring. The mixture is refluxed for 4 hours, at which time 2 moles (80 grams) NaOH is slowly added. The mass is cooled to room temperature, filtered to remove sodium chloride, and the product recovered by evaporation of the ethanol. The product, N,N-dilauryl-2-pyrrolidyl ethyl amine, contains 6.5% teritary amine nitrogen. Five parts of this amine is added to 95 parts of polypropylene to form a composition having 0.32% tertiary nitrogen. Filaments prepared from this composition retain 40% of their tensile strength after 50,000 langleys exposure.

EXAMPLE 11

A molding powder is prepared by adding 7.5 parts of the bis-stearamide of N,N-bis(aminopropyl) methylamine prepared as in Example 1 to 92.5 parts of crystalline polypropylene. This material is injection molded into ⅛ inch plaques. These are then exposed to sunlight to measure the degradative effect thereon.

Degradation in thick sections of the sort here employed is not indicated by loss of tensile strength, but by a deterioration, chalking and crazing of the surface. A specimen of conventionally stabilized polypropylene begins to exhibit substantial evidence of this deterioration after about six months exposure. The specimen stabilized with the tertiary amine of this example lasts about 9 months before any substantial amount of deterioration is noted.

EXAMPLE 12

A molding powder is prepared consisting of 10 parts of bis(2-dimethylaminoethyl)propane-1,3-bis(4-piperidyl isobutyrate) prepared as in Example 7 and 90 parts of heat stablized crystalline polypropylene. Tertiary nitrogen content of this composition is about 1%.

When the molding powder is injection molded into ⅛" plaques, the plaques show no significant amount of deterioration prior to about 11 months aging in sunlight.

EXAMPLE 13

A coating composition is prepared based on an organosol of stereoregular polypropylene in a mixture of heptane and kerosene containing 20% of polypropylene in the form of very finely divided particles. The organosol also contains 20%, based on polypropylene, of titanium dioxide pigment and 0.25% of a phenolic antioxidant. To this is added 5%, based on the weight of polypropylene of N,N-bis(3-stearamidopropyl) methylamine prepared as in Example 1. Tertiary amine nitrogen content was about 0.2%.

This composition was applied by brushing onto an aluminum panel followed by heating at 205° C. to remove the diluent and fuse the polypropylene. When exposed to sunlight at the South Miami Testing Area, the coated panel exhibited substantially no surface corrosion and was still in satisfactory glossy condition after 6 months.

By contrast, a control sample containing polypropylene stabilized with a conventional light stabilizer, i.e., 0.5% of 2-hydroxy-4-octyloxy benzophenone, had virtually no gloss and was very badly eroded after 6 months exposure.

EXAMPLE 14

Stereoregular polypropylene is compounded with 5% by weight of dimethyl octadecyl amine, thus incorporating about 0.215% tertiary nitrogen into the polymer. This composition is extruded into 210/35 yarn.

On aging, this yarn retains 79% of its tensile strength after 40,000 langleys exposure time.

EXAMPLE 15

Five percent (5%) by weight of the polyamine resin prepared by condensing formaldehyde with 1,3-bis-4-piperidyl propane having the approximate structure

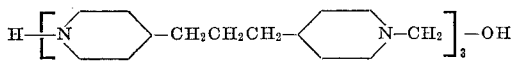

is melt blended into polypropylene. The resulting composition contains about 0.5% tertiary nitrogen by weight.

This composition is extruded into 210/35 yarns which, after aging for 40,000 langleys, retain 90% of their original tensile strength.

EXAMPLE 16

Polypropylene is compounded with 4.5% by weight of an alkyl tertiary amine which is a mixture of $C_{12}$- to $C_{17}$-dimethyl amines having an average molecular weight of about 245 (Armeen DML11 by Armour Chemical). The compound contains about 0.3% tertiary amine by weight.

When spun into 210/35 yarns, this composition retains 27% of its original tensile strength after 40,000 langleys exposure.

What I claim and desire to protect by Letters Patent is:

1. A light stabilized polyolefin composition having incorporated therein a tertiary amine group containing compound having a formula selected from the class consisting of:

(1) a material having the structural formula

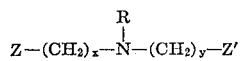

where $(CH_2)_x$ and $(CH_2)_y$ are the same or different normal or branched chain alkylene radicals of 1 to about 36 carbon atoms, R is selected from the class consisting of aliphatic and cycloaliphatic radicals and $(CH_2)_x$—Z and $(CH_2)_y$—Z', and Z and Z' being the same or different members of the class consisting of alkylamido and carboxyalkyl radicals, (2) a material having the structural formula:

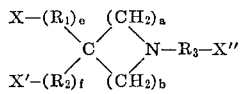

where $a$ and $b$ are integers from 0 to 4 whose sum is from 3 to 4, $e$ and $f$ are integers between 0 and 1, $R_1$, $R_2$ and $R_3$ are the same or different members of the class consisting of 1 to 12 carbon alkylene radicals and the cyclohexylene radical, and X and X' are the same or different members of the class consisting of hydrozen, amino, hydroxyl, carboxyl, and carboxyalkyl groups having up to 6 carbons in the alkyl moiety; and X'' is a member of the class consisting of X, X', and pyridyl radical, (3) a material having the structural formula:

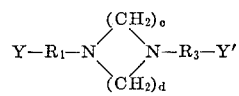

where Y and Y' are selected from the class consisting of hydroxyl, carboxyl, alkylamido and carboxyalkyl groups having up to 18 carbon atoms in the alkyl moiety, and one of $R_1Y$ or $R_2Y'$ can be hydrogen, and $c$ and $d$ are integers from 0 to 4 whose sum is 4, (4) bis-piperidyl alkanes, and (5) formaldehyde-piperidine condensation products;

said tertiary amine being present in an amount sufficient to provide 0.02 to 2% tertiary nitrogen based on the total weight of the composition.

2. The composition of claim 1 where the olefin polymer is selected from the class consisting of polyethylene, polypropylene, poly(4-methyl pentene-1), poly(3-methyl butene-1), and amorphous and crystalline copolymers of ethylene and propylene.

3. The composition of claim 2 where the compound is N,N-bis(3-stearamidopropyl) methyl amine.

4. The composition of claim 2 where the tertiary amine group-containing compound is 1,3-bis(N-alkyl-4-piperidyl)-propane.

5. The composition of claim 4 where the compound is 1,3-bis(N-butyl-4-piperidyl) propane.

6. The composition of claim 2 where the tertiary amine group-containing compound is N,N-bis(3-stearamidopropyl)-piperazine.

7. The composition of claim 2 where the tertiary amine group-containing compound is the condensation product of formaldehyde with 1,3-bis-4-piperidyl propane having the structural formula:

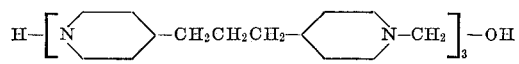

8. The composition of claim 2 when recovered in the form of drawn fibers.

9. The composition of claim 2 when recovered in the form of a film.

References Cited

UNITED STATES PATENTS

| | | | |
|---|---|---|---|
| 3,179,621 | 4/1965 | Wright et al. | 260—45.75 |
| 3,277,045 | 10/1966 | Bonvicini et al. | 260—45.8 |
| 3,288,748 | 11/1966 | Cyba | 260—45.9 |
| 3,309,337 | 3/1967 | Hurlock et al. | 260—41 |
| 3,335,108 | 8/1967 | Pines | 260—45.8 |
| 3,389,119 | 6/1968 | Sherrill | 260—45.9 |
| 3,418,272 | 12/1968 | Pines | 260—45.8 |
| 3,436,368 | 4/1969 | Murray | 260—45.8 |
| 3,436,370 | 4/1969 | Blumel | 260—45.9 |
| 3,414,532 | 12/1968 | Hecker et al. | 260—23 |

DONALD E. CZAJA, Primary Examiner

R. A. WHITE, Assistant Examiner

U.S. Cl. X.R.

260—45.85, 45.9